United States Patent
Lee et al.

(10) Patent No.: US 7,736,691 B2
(45) Date of Patent: Jun. 15, 2010

(54) METHOD FOR PREPARING FUNCTIONAL ORGANIC PARTICLE

(75) Inventors: Chang Soon Lee, Daejeon Metropolitan (KR); Woong Ki Lee, Daejeon Metropolitan (KR); Woo Cheul Jung, Ulsan Metropolitan (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/071,515

(22) Filed: Feb. 21, 2008

(65) Prior Publication Data
US 2008/0272343 A1  Nov. 6, 2008

Related U.S. Application Data

(62) Division of application No. 11/442,607, filed on May 30, 2006, now abandoned.

(30) Foreign Application Priority Data
Jun. 1, 2005  (KR) .................. 10-2005-0046706

(51) Int. Cl.
*H01B 1/00* (2006.01)
*H01B 1/06* (2006.01)

(52) U.S. Cl. .............. 427/113; 252/500; 252/502; 252/510; 252/511; 977/700; 977/773; 977/778; 977/779; 977/834; 427/212; 427/213.34; 427/220; 427/221

(58) Field of Classification Search ............ 252/500, 252/502, 510, 511; 521/146; 427/113, 212, 427/213.34, 220, 221; 977/700, 773, 778, 977/779, 784, 834
See application file for complete search history.

(56) References Cited

U.S. PATENT DOCUMENTS

| 4,358,388 | A | | 11/1982 | Daniel et al. | |
|---|---|---|---|---|---|
| 4,421,660 | A | | 12/1983 | Solc Nee Hajna | |
| 4,511,475 | A | | 4/1985 | Yuki et al. | |
| 5,908,872 | A | * | 6/1999 | Gluck et al. | 521/146 |
| 5,958,302 | A | * | 9/1999 | Cunningham et al. | 252/500 |
| 7,033,524 | B2 | * | 4/2006 | Kumacheva | 252/500 |
| 7,537,803 | B2 | * | 5/2009 | Wang et al. | 427/212 |

(Continued)

FOREIGN PATENT DOCUMENTS

EP  1207535 A1  5/2002

(Continued)

OTHER PUBLICATIONS

Jin-Woong Kim, et al., "Synthesis of Silver/Polymer Colloidal Composites from Surface-Functional Porous Polymer Microspheres," Polymer 45, May 18, 2004, Elsevier Ltd., pp. 4741-4747.

(Continued)

*Primary Examiner*—Mark Kopec
*Assistant Examiner*—Tri V Nguyen
(74) *Attorney, Agent, or Firm*—McKenna Long & Aldridge LLP

(57) ABSTRACT

The present invention relates to functional organic particles having functional nanoparticles dispersed in an organic polymeric matrix, wherein the distribution of the functional nanoparticles is increased in the direction toward increasing the particle diameter from the center of the functional organic particles, and to a method for preparing the same.

19 Claims, 2 Drawing Sheets

U.S. PATENT DOCUMENTS

| | | | |
|---|---|---|---|
| 2003/0229185 A1* | 12/2003 | Chen et al. | 526/59 |
| 2005/0089679 A1 | 4/2005 | Ittel et al. | |
| 2005/0142567 A1* | 6/2005 | Su et al. | 435/6 |
| 2006/0130192 A1 | 6/2006 | Lee et al. | |
| 2006/0286378 A1* | 12/2006 | Chiruvolu et al. | 428/402 |

FOREIGN PATENT DOCUMENTS

| | | |
|---|---|---|
| EP | 1433871 A1 | 6/2004 |
| JP | 2004-067703 | 3/2004 |
| KR | 10-2003-0049007 | 6/2003 |
| KR | 10-2005-0056326 A | 6/2005 |

OTHER PUBLICATIONS

"Chemical Engineers' Handbook," Fifth Edition, Selection of a Solids-Liquid Separator, p. 19-104.

* cited by examiner

METHOD FOR PREPARING FUNCTIONAL ORGANIC PARTICLE

This application is a Divisional of application Ser. No. 11/442,607 filed May 30, 2006, now abandoned which is hereby incorporated by reference as if fully set forth herein. This application claims the benefit of the Korean Patent Application No. 10-2005-0046706, filed on Jun. 1, 2005 which is hereby incorporated by reference as if fully set forth herein.

TECHNICAL FIELD

The present invention relates to functional organic particles, and a method for preparing the same. More specifically, the present invention relates to functional organic particles having functional nanoparticles dispersed in an organic polymeric matrix, which exhibit excellent functionality even with the use of a small amount of functional nanoparticles, and to a method for preparing the same.

The present application claims the benefit of Korean Patent Application No. 2005-0046706 (filed on Jun. 1, 2005), which is incorporated herein by its entirety for reference.

BACKGROUND ART

Conductive organic particles, as an example of the functional organic particles, have conventionally been prepared by a method comprising spreading a metal such as platinum on the surface of the fine organic particles synthesized by emulsion polymerization or dispersion polymerization in a post-treatment process. This conventional method has an advantage that a uniform and thin conductive film can be formed on the surface of the fine organic particle. However, it has disadvantages that it is difficult to select a polymerizable or spreadable raw material for, and the cost of the spreadable raw materials is high, thus it being difficult to provide massive production thereof.

In order to overcome the disadvantages, Korean Patent Laid-open publication No. 2003-0049007 describes a method which comprises mixing a nano-sized silver colloidal solution, a monomer, an emulsifier, an initiator, and the like, and then subjecting the mixture to emulsion polymerization, dispersion polymerization, microemulsion polymerization, or the like, so as to capsule the silver particles with a resin composition.

However, the capsule prepared by this method has the silver particles irregularly dispersed in the inside of the polymeric resin, and thus the silver particles deeply embedded in the polymeric resin do not play their roles. Therefore, the fact that a large amount of the silver particles should be added to obtain a sufficient effect poses a problem.

DISCLOSURE

Technical Problem

The present inventors found a structure of the functional organic particles which can exhibit excellent functionality even with the use of a small amount of functional nanoparticles. Further, the present inventors found a method for preparing the functional organic particles having such structure so that it have a uniform conformation and a narrow particle diameter distribution. Therefore, it is an object of the present invention to provide functional organic particles having such structure and a method for preparing the same.

Technical Solution

The present invention provides functional organic particles comprising an organic polymeric matrix, and functional nanoparticles dispersed in the organic polymeric matrix, wherein the distribution amount of the functional nanoparticles is increased in the direction toward increasing the particle diameter from the center, in order to accomplish the above described objects.

Further, the present invention provides a method for preparing the functional organic particles comprising an organic polymeric matrix, and functional nanoparticles dispersed in the organic polymeric matrix, which comprises a step of preparing a mixture of the monomers by mixing a monomer, a molecular weight modifier and the functional nanoparticles; a first reaction step of adding a polymerization initiator to the mixture of the monomers and reacting said mixture; and a second reaction step of mixing a product from the first reaction with a dispersant solution, and reacting said product by applying a centrifugal force required so as to increase the distribution amount of the functional nanoparticles in the direction toward increasing the particle diameter from the center of the functional organic particles.

The method for preparing the functional organic particles can further comprise, after the second reaction step, a third reaction step of applying, to the product from the second reaction, a centrifugal force weaker than that applied in the second reaction step.

The present invention will be described in detail below.

FIG. 1 is a cross-sectional view illustrating an example of the functional organic particles of the present invention. It should be noted that the present invention is not limited to the functional organic particles as configured in FIG. 1. Referring to FIG. 1, the functional organic particles (10) of the present invention comprise an organic polymeric matrix (11), and the functional nanoparticles (12) dispersed in the organic polymeric matrix, wherein the distribution amount of the functional nanoparticles (12) is increased in the direction toward increasing the particle diameter from the center of the functional organic particles (10).

In the case where the content of the functional nanoparticles is increased in the direction toward increasing the particle diameter from the center of the functional organic particles, the distribution amount of the functional nanoparticles positioned adjacent to the surface are increased, and thus the availability of the functional nanoparticles is increased. Accordingly, even with the use of a small amount of the functional nanoparticles, functional organic particles exhibiting relatively excellent functionality can be provided.

The monomer constituting the organic polymeric matrix contained in the functional organic particles is not particularly limited, but preferred is a monomer having at least one vinyl group. Specifically, i) at least one aromatic vinyl-based monomer selected from the group consisting of styrene, monochlorostyrene, methylstyrene and dimethylstyrene, ii) at least one acrylate-based monomer selected from the group consisting of methyl acrylate, ethyl acrylate, n-butyl acrylate, isobutyl acrylate, dodecyl acrylate and 2-ethylhexyl acrylate, iii) at least one methacrylate-based monomer selected from the group consisting of methyl methacrylate, ethyl methacrylate, n-butyl methacrylate, isobutyl methacrylate, dodecyl methacrylate and 2-ethylhexyl methacrylate, and iv) at least one a diene-based monomer selected from the group consisting of butadiene and isoprene can be used.

Further, the organic polymeric matrix is preferably polymerized with the addition of at least one crosslinking agent selected from the group consisting of divinylbenzene, ethylene dimethacrylate, ethylene glycol dimethacrylate, diethylene glycol diacrylate, 1,6-hexamethylene diacrylate, allyl methacrylate, 1,1,1-trimethylolpropane triacrylate, triallylamine and tetraallyloxyethane, to the monomers. The crosslinking agent can improve the mechanical strength of the functional organic particles.

The functional nanoparticles dispersed in the organic polymeric matrix are not limited in the functions and the kinds of the materials, as long as they impart the intended functions to the organic particle containing the same. In the present invention, the functional nanoparticles may be, for example, conductive nanoparticles, colored nanoparticles, charge control agents nanoparticles, or the like. In the case where the charge control agents are used as the nanoparticles having high friction electrification properties, it is possible to prepare antistatic functional organic particles.

The conductive nanoparticles may consist of a) at least one functional metal selected from the group consisting of copper, silver, gold, platinum, indium tin oxide (ITO) and antimony tin oxide (ATO), b) at least one nanocarbon selected from the group consisting of carbon black, graphite, carbon nanotube, fullerene, carbon nanohorn, carbon nanoring and carbon nanowire, or c) a mixture comprising at least two of them.

The functional nanoparticles are preferably contained in an amount of 0.1 to 50% by weight, relative to the total weight of the functional organic particles. If the content of the functional nanoparticles is less than 0.1% by weights, the functional organic particles cannot exhibit sufficient functionality, while if the content of the functional nanoparticles is more than 50% by weight, it is difficult to form the structure of the functional organic particles of the present invention.

The functional organic particles of the present invention preferably has a particle diameter of 100 nm to 1 mm, and more preferably a particle diameter of 0.5 to 100 μm. If the particle diameter of the functional organic particles is less than 100 nm, it is not easy to handle it, while if the particle diameter of the functional organic particles is more than 1 mm, the spacing between the functional nanoparticles becomes larger, and thus the functional organic particles may not sufficiently exhibit the functionality imparted by the functional nanoparticles.

Further, the functional nanoparticles contained in the functional organic particles preferably has a particle diameter of 10 nm to 100 μm, and more preferably a particle diameter of 10 nm to 1 μm. If the particle diameter of the functional nanoparticles is less than 10 nm, it is difficult for the functional nanoparticles to constitute a specific distribution, while if the particle diameter of the functional nanoparticles is more than 100 μm, it is difficult to form the structure of functional organic particles of the present invention.

However, for the purpose of allowing the functional nanoparticles to have a desired distribution in the present invention, the particle diameter of the functional nanoparticles is preferably ¼ or less of the particle diameter of the functional organic particles, within the above range of the particle diameters.

Particularly, in the functional organic particles, 70% to 100% of the total number of the functional nanoparticles are preferably contained in the outer region up to the point corresponding to 50% of the radius of the functional organic particle in the direction from the surface to the center of functional organic particle. If the number of the functional nanoparticles contained in the outer region is less than 70% of the total numbers, it is difficult to attain the stability of the nanoparticles, and the effect of improving the functionality in the functional organic particles is insignificant.

FIG. 2 is a cross-sectional view illustrating an example of the functional organic particles, in which 70% to 100% of the total number of the functional nanoparticles (12) are contained in the outer region (24) up to the point (23) corresponding to 50% of the radius of the functional organic particle in the direction from the surface to the center of the functional organic particle. It should be noted that the present invention is not limited to the functional organic particles as configured in FIG. 2.

Further, the functional organic particles of the present invention further preferably have a thickness of the functional nanoparticles-concentrated layer comprising 70% to 100% of the total number of the functional nanoparticles in the outer region (24), of 10 nm or more. If the thickness of the functional nanoparticles-concentrated layer is less than 10 nm, the structure of the organic particles may be corrupted while using the functional organic particles, and if the functional nanoparticles are the conductive nanoparticles, there is a fear that the transfer of the conductivity of the functional organic particles is blocked.

FIG. 3 is a cross-sectional view illustrating an example of the functional organic particles (30), in which the thickness of the region (33) comprising 70% to 100% of the total number of the functional nanoparticles (12) in the outer region (24) is 20 nm. It should be noted that the present invention is not limited to the functional organic particles as configured in FIG. 3.

Further, the functional organic particles of the present invention can further comprise a stabilizer for the functional nanoparticles, which are added so as to concentrate the functional nanoparticles around the surface of the functional organic particles. The stabilizer for the functional nanoparticles is preferably a polymeric material which is not sensitive to the temperatures or the acids. Specifically, it is more preferably at least one selected from the group consisting of linear ester-based polymers, styrene-based polymers and acrylate-based polymers, and most preferably at least one selected from the group consisting of styrene-butadiene-styrene, styrene-isoprene-styrene, styrene-ethylene-butylene-styrene, and styrene-ethylene-propylene-styrene block copolymers.

In order to provide the functional nanoparticles contained in the functional organic particles with a specific structure of the present invention, in the method for preparing the functional organic particles, it is preferable to apply a centrifugal force during the suspension polymerization.

Further, in order to exhibit the effect by applying the centrifugal force, the functional nanoparticles preferably have a higher specific density than that of the organic polymeric matrix. If the specific density of the functional nanoparticles is not higher than that of the organic polymeric matrix, the structure of the functional organic particles is not formed by the centrifugal force, and the distribution of the functional nanoparticles must depend only on a thermodynamic method. Therefore, it is difficult to concentrate the functional nanoparticles around the surface of the functional organic particles.

The functional organic particles of the present invention can be prepared by a method for preparing the functional organic particles, which comprises a step of preparing a mixture of the monomers by mixing a monomer, a molecular weight modifier, and the functional nanoparticles; a first reaction step of adding a polymerization initiator to the mixture of the monomers and reacting said mixture; and a second reaction step of mixing a product from the first reaction with a dispersant solution, and reacting said product by applying a centrifugal force required so as to increase the distribution amount of the functional nanoparticles in the direction toward increasing the particle diameter from the center of the functional organic particles.

The method for preparing the functional organic particles can further comprise, after the second reaction step, a third reaction step of applying a centrifugal force, to the product from the second reaction, weaker than that applied in the second reaction step.

The dispersant solution refers to a solution having a dispersant in an inert solvent. Non-limiting examples of the inert solvent include water.

As the molecular weight modifier, preferred is at least one selected from the group consisting of t-dodecyl mercaptan, n-dodecyl mercaptan, n-octyl mercaptan, carbon tetrachloride and carbon tetrabromide.

In the step of preparing a mixture of the monomers, a stabilizer for functional nanoparticles can be further added. Further, in the step of preparing the mixture of the monomers, a crosslinking agent can be further added.

In the method for preparing the functional organic particles, the monomers, the stabilizer for the functional nanoparticles, the functional nanoparticles, and the crosslinking agent are the same as defined above, thus detailed description thereof being omitted.

The mixture of the monomers are preferably prepared by mixing 0.001 to 8 parts by weight of a molecular weight modifier, and 0.1 to 50 parts by weight of the functional nanoparticles, and optionally preferably 0.1 to 50 parts by weight of a stabilizer for the functional nanoparticles, relative to 100 parts by weight of the monomers. If the compositions of the mixture of the monomers are not within the above range, it is difficult to form the structure of the functional organic particles of the present invention.

The method of preparing the mixture of the monomers is not particularly limited, but it preferably involves mixing the components at normal temperature at a rotation speed of 500 to 3000 rpm for 30 minutes to 5 hours, and more preferably mixing the monomers using a bead mill.

As the polymerization initiator which is added to the mixture of the monomers, a conventional polymerization initiator can be used. Specifically, an addition polymerization initiator can be used, and examples thereof include an azo-based initiator, an organic peroxide-based initiator, or persulfate, and preferably at least one polymerization initiator selected from the group consisting of azobisisobutyronitrile, azobisvaleronitrile, benzoyl peroxide, lauroyl peroxide, potassium persulfate, and ammonium persulfate.

The content of the polymerization initiator is not particularly limited, because it can be selectively used within the range of the content used in a conventional polymerization reaction. In the case of addition polymerization, preferably 0.01 to 5 parts by weight, and more preferably 0.1 to 2 parts by weight of the polymerization initiator is used, relative to 100 parts by weight of the monomers. If the content of the polymerization initiator is less than 0.01 parts by weight, the reaction proceeds slowly, and thus it is impossible to obtain a desired reaction yield. Further, if the content of the polymerization initiator is more than 5 parts by weight, the dispersity of the functional nanoparticles is lowered, and thus it is impossible to prepare preferable functional organic particles.

In the first reaction, the reaction is preferably performed under stirring at 30 to 95° C. for 1 to 30 minutes. If the temperature in the first reaction is lower than 30° C., or the reaction time for the first reaction is shorter than 1 minute, and thus sufficient initiation by the polymerization initiator does not occur. Further, if the temperature in the first reaction is higher than 90° C., or the reaction time for the first reaction is longer than 30 minutes, the viscosity of the reactant increases due to excessive reaction, and thus it is difficult to uniformly form particles.

Apart from the first reaction, a dispersant solution maintained at 30 to 95° C. is prepared. In order to avoid the drastic change in the temperature of the product of the first reaction, the temperature of the dispersant solution is more preferably maintained at the same temperature as that of the product of the first reaction.

In the second reaction step, the product of the first reaction is added to the dispersant solution and reacts there. Here, the dispersant is used for optimization of the particle diameter distribution of the functional organic particles. Examples of the dispersant preferably include a) at least one inorganic dispersant selected from the group consisting of silica, an insoluble calcium salt and an insoluble magnesium salt, b) at least one anionic surfactant selected from the group consisting of a fatty acid salt, an alkyl sulfuric acid ester salt, an alkylaryl sulfuric acid ester salt, dialkyl sulfosuccinate and alkyl phosphate, or c) at least one nonionic surfactant selected from the group consisting of polyoxyethylene alkyl ether, polyoxyalkylene alkylphenol ether, sorbitan fatty acid ester, polyoxyalkylene fatty acid ester, glycerin fatty acid ester, polyvinyl alcohol, alkyl cellulose, and polyvinylpyrrolidone, and more preferably colloidal silica, calcium phosphate, magnesium hydroxide, or polyvinyl alcohol.

The inert solvent in the dispersant solution is preferably water, and in this case, the concentration of the dispersant in the aqueous dispersant solution is not particularly limited, but it is preferably 0.1 to 50 parts by weight, relative to 100 parts by weight of water. If the content of the dispersant is less than 0.1 parts by weight, the effect of dispersant is insignificant. Further, the content of the dispersant is more than 50 parts by weight, due to the side reaction of emulsion polymerization, the particles containing no functional nanoparticles are generated, and thus the functional organic particles are not uniformly formed.

The second reaction step is preferably performed by mixing the product of the first reaction:the dispersant solution at a weight ratio of 1:95 to 50:50. If the weight ratio of the product of the first reaction:the dispersant solution is less than 1:95, the dispersion effect is remarkable, but the final amount of the functional organic particles to be produced is insignificant, and thus commercial production thereof is difficult. Further, if the weight ratio of the product of the first reaction: the dispersant solution is more than 50:50, the dispersion stability is hardly accomplished, and thus large particles may be formed during the polymerization reaction.

The second reaction step is preferably performed at 30 to 95° C. for 5 to 60 minutes. If the temperature of the second reaction is lower than 30° C., sufficient initiation of the polymerization initiator does not occur, and thus it is insufficient for the reaction to be proceeded. Further, if the reaction time is less than 5 minutes, the effect time of the centrifugal force to the particles is not sufficient, and thus it is insufficient for the desired particle structure, and the particle diameter of the functional organic particles is not uniform due to relatively short effect time of shear force. If the temperature in the second reaction is higher than 95° C. or the reaction time for the second reaction is longer than 60 minutes, excessive reaction occurs, thus leading to a fear of agglomeration of the reactants.

Further, in the second reaction step, a centrifugal force required so as to increase the distribution amount of the functional nanoparticles in the direction toward increasing the particle diameter from the center of the functional organic particles is preferably applied to the reactants. The centrifugal force can be applied using a common stirrer or a homogenizer, and preferably a homogenizer in the second reaction step.

The centrifugal force required so as to increase the distribution amount of the functional nanoparticles in the direction toward increasing the particle diameter from the center of the functional organic particles varies depending on the particle diameter and the distribution of desired functional organic particles, and preferably it is in the range of approximately 50 G to 5,000 G. If the centrifugal force is less than 50 G, the functional nanoparticles are not distributed outwardly from the functional organic particles, while if the centrifugal force is more than 5,000 G, the structure of the functional organic particles may be corrupted due to excessive centrifugal force.

The centrifugal force applied in the second reaction step are divided into a centrifugal force applied by a rotation speed of the rotor of a stirrer, particularly a homogenizer (revolutional centrifugal force), and a centrifugal force in the inside of the particle by the rotation of the particles generated by the shear force applied to the functional organic particles (rotational centrifugal force). These two types of the centrifugal force act in combination, so as to allow the functional nanoparticles to be positioned in the surface direction thereof.

In the third reaction step, it is preferable that the reaction continuously proceeds at 30 to 95° C. for 5 to 30 hours, and preferably 5 to 15 hours. Further, in the third reaction step, it is preferable to apply a smaller centrifugal force than that in the second reaction step. For example, in the range of 1 G to 1,000 G, a smaller centrifugal force than that in the second reaction step is preferred. In this case, in the similar way to the second reaction step, a revolutional centrifugal force and a rotational centrifugal force act on these functional organic particles.

There occurs a phenomenon that the functional nanoparticles are concentrated on the surface of the functional organic particles due to the centrifugal force usually at an initial stage in the reaction. If the polymerization reaction proceeds to a certain degree, the viscosity of the organic polymeric matrix increases, and thus the speed of the concentration of the functional nanoparticles on the surface thereof is drastically lowered.

Accordingly, in order to prepare effective functional organic particles, design of a stabilizer for the functional nanoparticles, and regulation of the centrifugal force and the reaction rate with a stirrer should be appropriately combined.

After completion of the third reaction step, if desired, a post-treatment step may be performed so as to remove the dispersant added in the reaction process and the agglomerates generated in the reaction step.

The method for removing the dispersant in the post-treatment step is not particularly limited, but in the case of colloidal silica, a method in which an aqueous sodium hydroxide solution is added to the functional organic particle suspension obtained after completion of the third reaction step, so as to adjust the concentration of sodium hydroxide to 0.05 to 0.2 N, can be used.

Further, the agglomerates produced in the above-described reaction step can be screened using a sieve. The mesh of the sieve can be arbitrarily selected according to a desired size of the functional organic particles.

The product of the third reaction having the dispersant and the agglomerates removed, the product of the third reaction can be further subjected to a centrifugal separation-decantation-redispersion process, during which the remaining dispersant and the reaction by-products can be removed.

The product of the third reaction, from which the dispersant and the reaction by-products were removed, is further filtered to remove moisture, and dried to obtain final functional organic particles. FIG. 4 illustrates a TEM photograph of a cross-section of the functional organic particles having the functional nanoparticles distributed on the surface.

Hereinbelow, preferred examples of the present invention will be described. The following examples are only for the illustrative purpose, not limiting the scope of the present invention.

BEST MODE

Example 1

Figure 1:
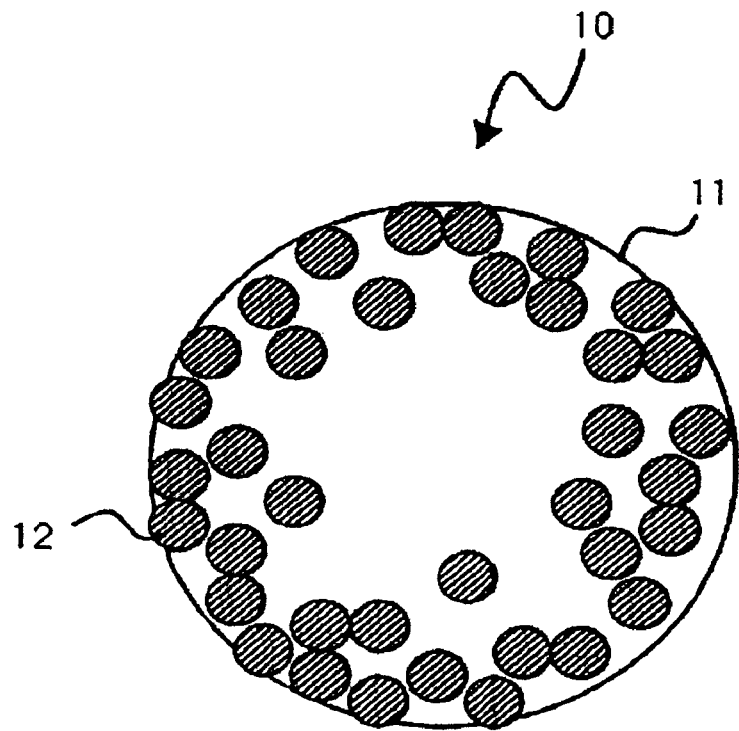
FIG. 1 is a cross-sectional view illustrating an example of the functional organic particles of the present invention.
Figure 2:
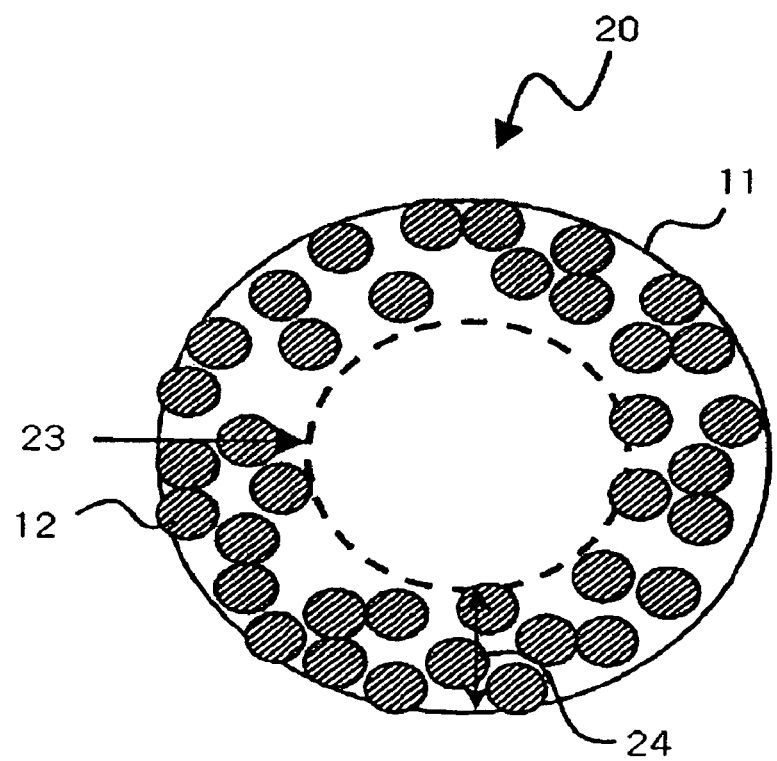
FIG. 2 is a cross-sectional view illustrating of an example of the functional organic particles, in which 70% to 100% of the total number of the functional nanoparticles are contained in the outer region up to the point corresponding to 50% of the radius of the functional organic particle in the direction from the surface to the center of functional organic particle.
Figure 3:
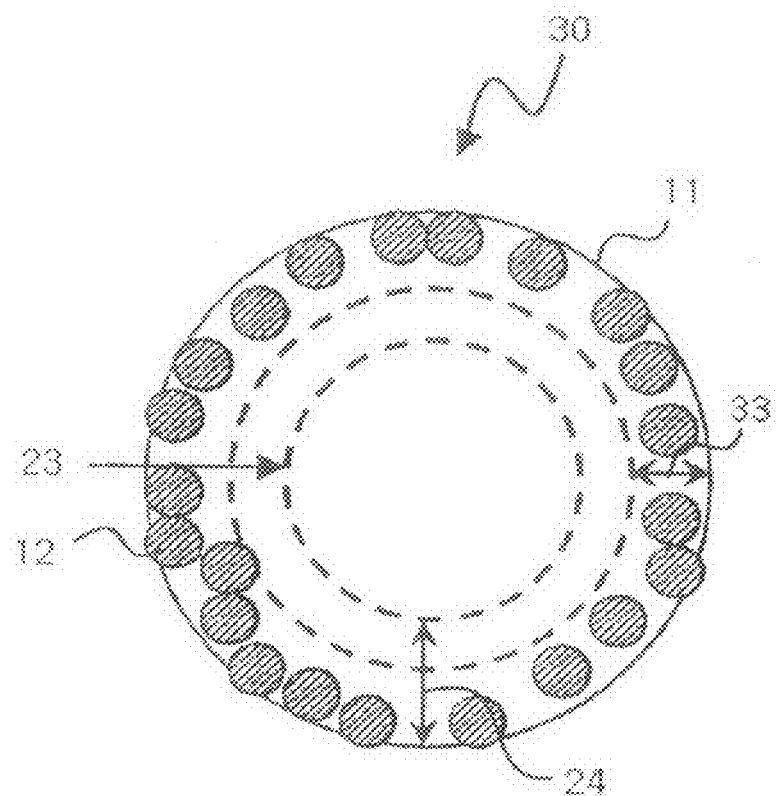
FIG. 3 is a cross-sectional view illustrating an example of the functional organic particles, in which the thickness of the region comprising 70% to 100% of the total number of the functional nanoparticles in the outer region is 20 nm.
Figure 4:
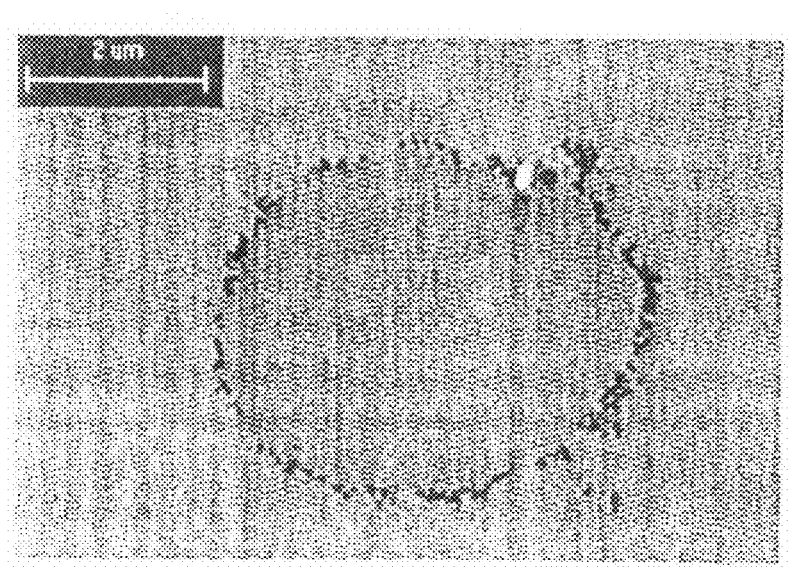
FIG. 4 is a view illustrating a photograph of a cross-section of the functional organic particles having the functional nanoparticles distributed on the surface.

(Preparation of Powders of Functional Organic Particles)

In a reactor with an inner volume of 500 ml, 10 g of colloidal silica as a dispersant was melted in 400 g of distilled water, and the reaction temperature was raised to 70° C., which is a reaction temperature, to prepare a dispersant solution.

Separately, 160 g of styrene, 40 g of butyl acrylate, 4 g of allyl methacrylate as a crosslinking agent, and 0.02 g of n-dodecyl mercaptan as a molecular weight modifier were added and mixed, and 3.5 g of a styrene-butadiene-styrene block copolymer as a stabilizer for the functional nanoparticles, having a styrene content of 30% by weight and a weight average molecular weight of 70,000 g/mole was sufficiently melted into the mixture. To the mixture, 10 g of indium tin oxide (ITO) having a mean particle diameter of 50 nm was added, the resultant was stirred at 2,000 rpm for 2 hours using a bead mill, and then the beads were removed, thereby obtaining 105 g of a mixture of the monomers.

The mixture of the monomers was put into a water bath at 70° C. to elevate the temperature thereof, 2 g of azobisisobutyronitrile as a polymerization initiator was added thereto, and the mixture was stirred for 5 minutes to perform a first reaction.

The product of the first reaction was mixed with the previously prepared dispersant solution, and the mixture was stirred using a homogenizer at a centrifugal force of 2,000 G at 70° C. for 20 minutes to perform a second reaction.

The product of the second reaction was subject to the third reaction by applying a centrifugal force of 15 G using a common stirrer at 70° C. for 15 hours to prepare functional organic particles.

(Post-treatment)

Thus prepared functional organic particles were present in the suspension form, to which an aqueous sodium hydroxide solution was added to adjust the concentration of sodium hydroxide to 0.1 N, and thus silica as a dispersant was removed from the surface of the functional organic particles.

After the above-described process, the resultant was sieved with a 150-mesh sieve to remove the agglomerates and then dried.

The product of the third reaction, which had remained after drying, was subject to repetition of the processes of centrifugal separation-decantation-redispersion, to remove the dispersant and the reaction by-products. Further, the remaining product was filtered to remove moisture, and thus the remaining cake of the functional organic particles was dried under vacuum at normal temperature for 48 hours, to prepare powders of the functional organic particles.

Example 2

(Preparation of Powders of Functional Organic Particles)

In a reactor with an inner volume of 500 ml, 10 g of colloidal silica as a dispersant was melted in 400 g of distilled water, and the reaction temperature was raised to 70° C., which is a reaction temperature, to prepare a dispersant solution.

Separately, 160 g of styrene, 40 g of butyl acrylate, 4 g of allyl methacrylate as a crosslinking agent, and 0.02 g of n-dodecyl mercaptan as a molecular weight modifier were added and mixed, and 3.5 g of a styrene-butadiene-styrene block copolymer as a stabilizer for the functional nanoparticles, having a styrene content of 30% by weight and a weight average molecular weight of 70,000 g/mole was sufficiently melted into the mixture. To the mixture, 2 g of carbon black FW200 (Degussa) having an mean particle diameter of 13 nm was added, the resultant was stirred at 2,000 rpm for 2 hours using a bead mill, and then the beads were removed, thereby obtaining 105 g of a mixture of the monomers.

The mixture of the monomers was put into a water bath at 70° C. to elevate the temperature thereof, 2 g of azobisisobutyronitrile as a polymerization initiator was added thereto, and the mixture was stirred for 5 minutes to perform a first reaction.

The product of the first reaction was mixed with the previously prepared dispersant solution, and the mixture was stirred using a homogenizer at a centrifugal force of 2,000 G at 70° C. for 20 minutes to perform a second reaction.

Using a common stirrer, the product of the second reaction was subject to the third reaction by applying a centrifugal force of 15 G at 70° C. for 15 hours to prepare functional organic particles.

(Post-treatment)

Thus prepared functional organic particles were present in the suspension form, to which an aqueous sodium hydroxide solution was added to adjust the concentration of sodium hydroxide to 0.1 N, and thus silica as a dispersant was removed from the surface of the functional organic particles.

After the above-described process, the resultant was sieved with a 150-mesh sieve to remove the agglomerates and then dried.

The product of the third reaction, which had remained after drying, was subject to repetition of the processes of centrifugal separation-decantation-redispersion, to remove the dispersant and the reaction by-products. Further, the remaining product was filtered to remove moisture, and thus the remaining cake of the functional organic particles was dried under vacuum at normal temperature for 48 hours, to prepare powders of the functional organic particles.

Example 3

(Preparation of Powders of Functional Organic Particles)

In a reactor with an inner volume of 500 ml, 10 g of colloidal silica as a dispersant was melted in 400 g of distilled water, and the reaction temperature was raised to 70° C., which is a reaction temperature, to prepare a dispersant solution.

Separately, 160 g of styrene, 40 g of butyl acrylate, 4 g of allyl methacrylate as a crosslinking agent, and 0.02 g of n-dodecyl mercaptan as a molecular weight modifier were added and mixed, and 3.5 g of a styrene-butadiene-styrene block copolymer as a stabilizer for the functional nanoparticles, having a styrene content of 30% by weight and a weight average molecular weight of 70,000 g/mole was sufficiently melted into the mixture. To the mixture, 20 g of indium tin oxide (ITO) having a mean particle diameter of 50 nm was added, the resultant was stirred at 2,000 rpm for 2 hours using a bead mill, and then the beads were removed, to prepare 105 g of a mixture of the monomers.

The mixture of the monomers was put into a water bath at 70° C. to elevate the temperature thereof, 2 g of azobisisobutyronitrile as a polymerization initiator was added thereto, and the mixture was stirred for 5 minutes to perform a first reaction.

The product of the first reaction was mixed with the previously prepared dispersant solution, and the mixture was stirred using a common stirrer at a centrifugal force of 50 G at 70° C. for 20 minutes to perform a second reaction.

The product of the second reaction was subject to the third reaction by applying a centrifugal force of 40 G using the common stirrer at 70° C. for 15 hours to prepare functional organic particles.

(Post-treatment)

Thus prepared functional organic particles were present in the suspension form, to which an aqueous sodium hydroxide solution was added to adjust the concentration of sodium hydroxide to 0.1 N, and thus silica as a dispersant was removed from the surface of the functional organic particles.

After the above-described process, the resultant was sieved with a 150-mesh sieve to remove the agglomerates and then dried.

The product of the third reaction, which had remained after drying, was subject to repetition of the processes of centrifugal seperation-decantation-redispersion, to remove the dispersant and the reaction by-products. Further, the remaining product was filtered to remove moisture, and thus the remaining cake of the functional organic particles was dried under vacuum at normal temperature for 48 hours, to prepare powders of the functional organic particles.

Example 4

Powders of the functional organic particles were prepared in the same manner as in Example 1, except that 3.5 g of a styrene-ethylene-butylene-styrene (SEBS) copolymer as a stabilizer for the functional nanoparticles, and 10 g of carbon nanotubes as the functional nanoparticles were used.

Comparative Example 1

(Preparation of Powders of Functional Organic Particles)

In a reactor with an inner volume of 500 ml, 10 g of colloidal silica as a dispersant was melted in 400 g of distilled water, and the reaction temperature was raised to 70° C., which is a reaction temperature, to prepare a dispersant solution.

Separately, 160 g of styrene, 40 g of butyl acrylate, 4 g of allyl methacrylate as a crosslinking agent, and 0.02 g of n-dodecyl mercaptan as a molecular weight modifier were added and mixed, and 3.5 g of a styrene-butadiene-styrene block copolymer as a stabilizer for the functional nanoparticles, having a styrene content of 30% by weight and a weight average molecular weight of 70,000 g/mole was sufficiently melted into the mixture. To the mixture, 0.1 g of carbon black having an mean particle diameter of 12 nm was added, the resultant was stirred at 2,000 rpm for 2 hours using a bead mill, and then the beads were removed, thereby preparing 105 g of a mixture of the monomers.

The mixture of the monomers was put into a water bath at 70° C. to elevate the temperature thereof, 2 g of azobisisobutyronitrile as a polymerization initiator was added thereto, and the mixture was stirred for 5 minutes to perform a first reaction.

The product of the first reaction was mixed with the previously prepared dispersant solution, and the mixture was stirred using a homogenizer at a centrifugal force of 4,000 G at 70° C. for 20 minutes to perform a second reaction.

The product of the second reaction was subject to the third reaction by applying a centrifugal force of 15 G using a common stirrer at 70° C. for 15 hours to prepare functional organic particles.

(Post-treatment)

Thus prepared functional organic particles were present in the suspension form, to which an aqueous sodium hydroxide solution was added to adjust the concentration of sodium hydroxide to 0.1 N, and thus silica as a dispersant was removed from the surface of the functional organic particles.

After the above-described process, the resultant was sieved with a 150-mesh sieve to remove the agglomerates and then dried.

The product of the third reaction, which had remained after drying, was subject to repetition of the processes of centrifugal separation-decantation-redispersion, to remove the dispersant and the reaction by-products. Further, the remaining product was filtered to remove moisture, and thus the remaining cake of the functional organic particles was dried under vacuum at normal temperature for 48 hours, to prepare powders of the functional organic particles.

Comparative Example 2

(Preparation of Powders of Functional Organic Particles)

In a reactor with an inner volume of 500 ml, 10 g of colloidal silica as a dispersant was melted in 400 g of distilled water, and the reaction temperature was raised to 70° C., which is a reaction temperature, to prepare a dispersant solution.

Separately, 160 g of styrene, 40 g of butyl acrylate, 4 g of allyl methacrylate as a crosslinking agent, and 0.02 g of n-dodecyl mercaptan as a molecular weight modifier were added and mixed, and 3.5 g of a styrene-butadiene-styrene block copolymer as a stabilizer for the functional nanoparticles, having a styrene content of 30% by weight and a weight average molecular weight of 70,000 g/mole was sufficiently melted into the mixture. To the mixture, 100 g of indium tin oxide (ITO) having a mean particle diameter of 50 nm was added, the resultant was stirred at 2,000 rpm for 2 hours using a bead mill, and then the beads were removed, to prepare 105 g of a mixture of the monomers.

The mixture of the monomers was put into a water bath at 70° C. to elevate the temperature thereof, 2 g of azobisisobutyronitrile as a polymerization initiator was added thereto, and the mixture was stirred for 5 minutes to perform a first reaction.

The product of the first reaction was mixed with the previously prepared dispersant solution, and the mixture was stirred using a common stirrer at a centrifugal force of 10 G at 70° C. for 20 minutes to perform a second reaction.

The product of the second reaction was subject to the third reaction by applying a centrifugal force of 1 G using a common stirrer at 70° C. for 15 hours to prepare functional organic particles.

(Post-treatment)

Thus prepared functional organic particles were present in the suspension form, to which an aqueous sodium hydroxide solution was added to adjust the concentration of sodium hydroxide to 0.1 N, and thus silica as a dispersant was removed from the surface of the functional organic particles.

After the above-described process, the resultant was sieved with a 150-mesh sieve to remove the agglomerates and then dried.

The product of the third reaction, which had remained after drying, was subject to repetition of the processes of centrifugal seperation-decantation-redispersion, to remove the dispersant and the reaction by-products. Further, the remaining product was filtered to remove moisture, and thus the remaining cake of the functional organic particles was dried under vacuum at normal temperature for 48 hours, to prepare powders of the functional organic particles.

Comparative Example 3

(Preparation of Powders of Functional Organic Particles)

In a reactor with an inner volume of 500 ml, 10 g of colloidal silica as a dispersant was melted in 400 g of distilled water, and the reaction temperature was raised to 70° C., which is a reaction temperature, to prepare a dispersant solution.

Separately, 160 g of styrene, 40 g of butyl acrylate, 4 g of allyl methacrylate as a crosslinking agent, and 0.02 g of n-dodecyl mercaptan as a molecular weight modifier were added and mixed, and 3.5 g of a styrene-butadiene-styrene block copolymer as a stabilizer for the functional nanoparticles, having a styrene content of 30% by weight and a weight average molecular weight of 70,000 g/mole was sufficiently melted into the mixture. To the mixture, 5 g of carbon black having a mean particle diameter of 12 nm was added, the resultant was stirred at 2,000 rpm for 2 hours using a bead mill, and then the beads were removed, to prepare 105 g of a mixture of the monomers.

The mixture of the monomers was put into a water bath at 70° C. to elevate the temperature thereof, 2 g of azobisisobutyronitrile as a polymerization initiator was added thereto, and the mixture was stirred for 5 minutes to perform a first reaction.

The product of the first reaction was mixed with the previously prepared dispersant solution, and the mixture was stirred using a common stirrer at a centrifugal force of 10 G at 70° C. for 20 minutes to perform a second reaction.

The product of the second reaction was subject to the third reaction by applying a centrifugal force of 1 G using a common stirrer at 70° C. for 15 hours to prepare functional organic particles.

(Post-treatment)

Thus prepared functional organic particles were present in the suspension form, to which an aqueous sodium hydroxide solution was added to adjust the concentration of sodium hydroxide to 0.1 N, and thus silica as a dispersant was removed from the surface of the functional organic particles.

After the above-described process, the resultant was sieved with a 150-mesh sieve to remove the agglomerates and then dried.

The product of the third reaction, which had remained after drying, was subject to repetition of the processes of centrifugal separation-decantation-redispersion, to remove the dispersant and the reaction by-products. Further, the remaining product was filtered to remove moisture, and thus the remaining cake of the functional organic particles was dried under vacuum at normal temperature for 48 hours, to prepare powders of the functional organic particles.

Comparative Example 4

(Preparation of Powders of Organic Particles)

In a reactor with an inner volume of 500 ml, 10 g of colloidal silica as a dispersant was melted in 400 g of distilled water, and the reaction temperature was raised to 70° C., which is a reaction temperature, to prepare a dispersant solution.

Separately, 160 g of styrene, 40 g of butyl acrylate, 4 g of allyl methacrylate as a crosslinking agent, and 0.02 g of n-dodecyl mercaptan as a molecular weight modifier were added and mixed, and 3.5 g of a styrene-butadiene-styrene block copolymer having a styrene content of 30% by weight and a weight average molecular weight of 70,000 g/mole was sufficiently melted into the mixture. The resultant was stirred at 2,000 rpm for 2 hours using a bead mill, and then the beads were removed, to prepare 105 g of a mixture of the monomers.

The mixture of the monomers was put into a water bath at 70° C. to elevate the temperature thereof, 2 g of azobisisobutyronitrile as a polymerization initiator was added thereto, and the mixture was stirred for 5 minutes to perform a first reaction.

The product of the first reaction was mixed with the previously prepared dispersant solution, and the mixture was stirred using a homogenizer at a centrifugal force of 2,000 G at 70° C. for 20 minutes to perform a second reaction.

The product of the second reaction was subject to the third reaction by applying a centrifugal force of 15 G using a common stirrer at 70° C. for 15 hours to prepare organic particles.

(Post-treatment)

Thus prepared organic particles were present in the suspension form, to which an aqueous sodium hydroxide solution was added to adjust the concentration of sodium hydroxide to 0.1 N, and thus silica as a dispersant was removed from the surface of the organic particles.

After the above-described process, the resultant was sieved with a 150-mesh sieve to remove the agglomerates and then dried.

The product of the third reaction, which had remained after drying, was subject to repetition of the processes of centrifugal seperation-decantation-redispersion, to remove the dispersant and the reaction by-products. Further, the remaining product was filtered to remove moisture, and thus remaining cake of the organic particles was dried under vacuum at normal temperature for 48 hours, to prepare powders of the organic particles. Platinum was deposited on the surface of the organic particles to obtain organic particles having a thickness of the platinum layer of 0.1 μm.

Various physical properties of the functional organic particles prepared according to Examples 1 to 4 and Comparative Examples 1 to 4 was measured in the following manner, and the results are shown in the following Table 1.

* Mean Particle Diameter and Particle Diameter Distribution

Using a multisizer coulter counter, a mean volume diameter was measured, and using SEM, the particle diameter and the particle diameter distribution were measured. In the following Table 1, the particle diameter distribution indicates a standard deviation of the particle diameter.

* Distribution of Functional Nanoparticles

Using TEM, the distribution of the functional nanoparticles was measured.

* Electric Conductivity

Using an equipment for measuring the resistance of the powders, the volume resistance was measured, thus giving measurements of the electric conductivity of the functional organic particles.

TABLE 1

|  | mean particle diameter (μm) | particle diameter distribution (μm) | Distribution amount (%) of functional nanoparticles contained in the outer region | Electric Conductivity (S/cm) | Amount of agglomerates relative to solids (% by weight) |
| --- | --- | --- | --- | --- | --- |
| Ex. 1 | 7.2 | 1.8 | 85 | $3.7 \times 10^{-5}$ | 1.2 |
| Ex. 2 | 7.6 | 1.7 | 90 | $4.3 \times 10^{-5}$ | 2.3 |
| Ex. 3 | 98 | 20 | 75 | $2.1 \times 10^{-4}$ | 12.3 |
| Ex. 4 | 6.9 | 1.5 | 95 | $4.3 \times 10^{-4}$ | 0.6 |
| Comp. Ex. 1 | 0.12 | 0.02 | 45 | $2.1 \times 10^{-6}$ | 3.4 |
| Comp. Ex. 2 | 102 | 21 | 42 | $2.6 \times 10^{-7}$ | 15.3 |
| Comp. Ex. 3 | 7.6 | 2.0 | 21 | $3.4 \times 10^{-7}$ | 2.1 |
| Comp. Ex. 4 | 7.6 | 1.6 | — | $2.0 \times 10^{-5}$ | 3.0 |

The outer region refers to a region up to the point corresponding to 50% of the radius of the functional organic particle in the direction from the surface to the center of functional organic particle.

As shown in the above Table 1, the functional organic particles of the present invention exhibit uniform particle diameter distribution and excellent electric conductivity.

INDUSTRIAL APPLICABILITY

The functional organic particles of the present invention can exhibit relatively excellent functionality even with the use of a small amount of the functional nanoparticles. In the present invention, if conductive nanoparticles are used as the functional nanoparticles, it is possible to easily improve the functionalities of shielding micro wavelength as active ingredients of plastics for shielding micro wavelength, or coating compositions for shielding micro wavelength, and they can be also used as a laser printer developer which allows a high resolution pattern to be formed, instead of a toner.

The invention claimed is:

1. A method for preparing functional organic particles comprising an organic polymeric matrix and functional nanoparticles dispersed in the organic polymeric matrix, which comprises:
   a) a step of preparing a mixture of monomers by mixing a monomer, a molecular weight modifier, and the functional nanoparticles;
   b) a first reaction step of adding a polymerization initiator to the mixture of the monomers and starting the first reaction to give a product of the first reaction;
   c) a second reaction step of mixing the product of the first reaction with a dispersant solution, and starting the second reaction by applying a centrifugal force of 50 to 5,000 G to give a product of the second reaction, so as to contain 70% to 100% of a total number of the functional nanoparticles in an outer region up to a point corresponding to 50% of a radius of the functional organic particle in a direction from a surface to a center of the functional organic particles; and
   d) a third reaction step of applying, to the product of the second reaction, a centrifugal force of 1 to 1000 G, weaker than the centrifugal force applied in the second reaction step.

2. The method for preparing the functional organic particles according to claim 1, wherein the monomer in the a) step is at least one selected from the group consisting of:
   i) at least one aromatic vinyl-based monomer selected from the group consisting of styrene, monochlorostyrene, methylstyrene and dimethylstyrene;
   ii) at least one acrylate-based monomer selected from the group consisting of methyl acrylate, ethyl acrylate, n-butyl acrylate, isobutyl acrylate, dodecyl acrylate and 2-ethylhexyl acrylate;
   iii) at least one methacrylate-based monomer selected from the group consisting of methyl methacrylate, ethyl methacrylate, n-butyl methacrylate, isobutyl methacrylate, dodecyl methacrylate and 2-ethylhexyl methacrylate; and
   iv) at least one a diene-based monomer selected from the group consisting of butadiene and isoprene.

3. The method for preparing the functional organic particles according to claim 1, wherein the polymerization is performed with the addition of at least one crosslinking agent selected from the group consisting of divinylbenzene, ethylene dimethacrylate, ethylene glycol dimethacrylate, diethylene glycol diacrylate, 1,6-hexamethylene diacrylate, allyl methacrylate, 1,1,1-trimethylolpropane triacrylate, triallylamine and tetraallyloxyethane in the a) step.

4. The method for preparing the functional organic particles according to claim 1, wherein the molecular weight modifier in the a) step is at least one selected from the group consisting of t-dodecyl mercaptan, n-dodecyl mercaptan, n-octyl mercaptan, carbon tetrachloride and carbon tetrabromide.

5. The method for preparing the functional organic particles according to claim 1, wherein in a) step, a stabilizer for the functional nanoparticles is further added.

6. The method for preparing the functional organic particles according to claim 1, wherein the mixture of the monomers in the a) step are prepared by mixing 0.001 to 8 parts by weight of a molecular weight modifier, and 0.1 to 50 parts by weight of the functional nanoparticles, and 0.01 to 50 parts by weight of the polymerization initiator in the b) step is used, relative to 100 parts by weight of the monomers.

7. The method for preparing the functional organic particles according to claim 1, wherein the dispersant in the c) step includes at least one dispersant selected from:
   i) at least one inorganic dispersant selected from the group consisting of silica, an insoluble calcium salt and an insoluble magnesium salt;
   ii) at least one anionic surfactant selected from the group consisting of a fatty acid salt, an alkyl sulfuric acid ester salt, an alkylaryl sulfuric acid ester salt, dialkyl sulfosuccinate and alkyl phosphate; or
   iii) at least one nonionic surfactant selected from the group consisting of polyoxyethylene alkyl ether, polyoxyalkylene alkylphenol ether, sorbitan fatty acid ester, polyoxyalkylene fatty acid ester, glycerin fatty acid ester, polyvinyl alcohol, alkyl cellulose, and polyvinylpyrrolidone.

8. The method for preparing the functional organic particles according to claim 1, wherein inert solvent in the dispersant solution in the c) step is water, and dispersant in the aqueous dispersant solution is contained in a proportion of 0.1 to 50 parts by weight, relative to 100 parts by weight of water.

9. The method for preparing the functional organic particles according to claim 8, wherein in the c) step, the weight ratio of the product of the first reaction and the dispersant solution is 1:95 to 50:50.

10. The method for preparing the functional organic particles according to claim 1, wherein in the b) step, the reaction is preferably performed under stirring at 30 to 95° C. for 1 to 30 minutes, and in the c) step, and the reaction is performed under application of 50 to 5000 G of a centrifugal force by stirring at 30 to 95° C. for 5 to 60 minutes.

11. The method for preparing the functional organic particles according to claim 1, wherein in the d) step, and the reaction is performed under application of 1 G to 1000 G of a centrifugal force by stirring at 30 to 95° C. for 5 to 30 hours.

12. The method for preparing the functional organic particles according to claim 1, wherein the functional organic particles have a particle diameter of 100 nm to 1 mm, the functional nanoparticles have a particle diameter of 10 nm to 100 μm, and the particle diameter of the functional nanoparticles is ¼ or less of the particle diameter of the functional organic particles.

13. The method for preparing the functional organic particles according to claim 1, wherein the functional nanoparticles are used in an amount of 0.1 to 50% by weight, relative to the total weight of the functional organic particles, in the functional organic particles.

14. The method for preparing the functional organic particles according to claim 1, wherein the functional nanoparticles have higher specific densities than those of the organic polymeric matrix.

15. The method for preparing the functional organic particles according to claim 1, wherein the functional nanoparticles are conductive nanoparticles, colored nanoparticles or charge control agents nanoparticles.

16. The method for preparing the functional organic particles according to claim 1, wherein, after the c) step, a step of removing the dispersant, reaction agglomerates and reaction by-products, are further carried out.

17. The method for preparing the functional organic particles according to claim 1, wherein, after the d) step, a step of removing the dispersant, reaction agglomerates and reaction by-products, is further carried out.

18. The method for preparing the functional organic particles according to claim 1, wherein, after the c) step, a step of filtering to remove moisture and drying is further carried out.

19. The method for preparing the functional organic particles according to claim 1, wherein, after the d) step, a step of filtering to remove moisture and drying is further carried out.

* * * * *